Dec. 8, 1925.

J. W. HANCOCK

DEPHLEGMATOR

Filed Feb. 16, 1923

1,564,564

INVENTOR
John W. Hancock.
BY
Arthur C. Brown
ATTORNEY

Patented Dec. 8, 1925.

1,564,564

UNITED STATES PATENT OFFICE.

JOHN W. HANCOCK, OF ARDMORE, OKLAHOMA.

DEPHLEGMATOR.

Application filed February 16, 1923. Serial No. 619,372.

*To all whom it may concern:*

Be it known that I, JOHN W. HANCOCK, a citizen of the United States, residing at Ardmore, in the county of Carter and State of Oklahoma, have invented certain new and useful Improvements in Dephlegmators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dephlegmators and the primary object of the invention is to provide an efficient form of dephlegmator which will effectively condense or separate the heavier hydrocarbon vapors from the lighter ones, permitting the lighter ends to pass off through a discharge port where they may be subsequently condensed to the liquid phase to produce commercial gasoline.

The invention herein illustrated consists of an air cooled heat exchanger through which the incoming vapors at super-atmospheric pressure pass, the temperature of the vapors being lowered so that the heavier ends will be condensed to be recovered for re-distillation or for other use.

Means is provided for varying the amount of air passed through the heat exchanger under varying atmospheric conditions.

The invention will be clearly understood by reference to the following description in connection with the accompanying drawings, in which—

Figure 1:
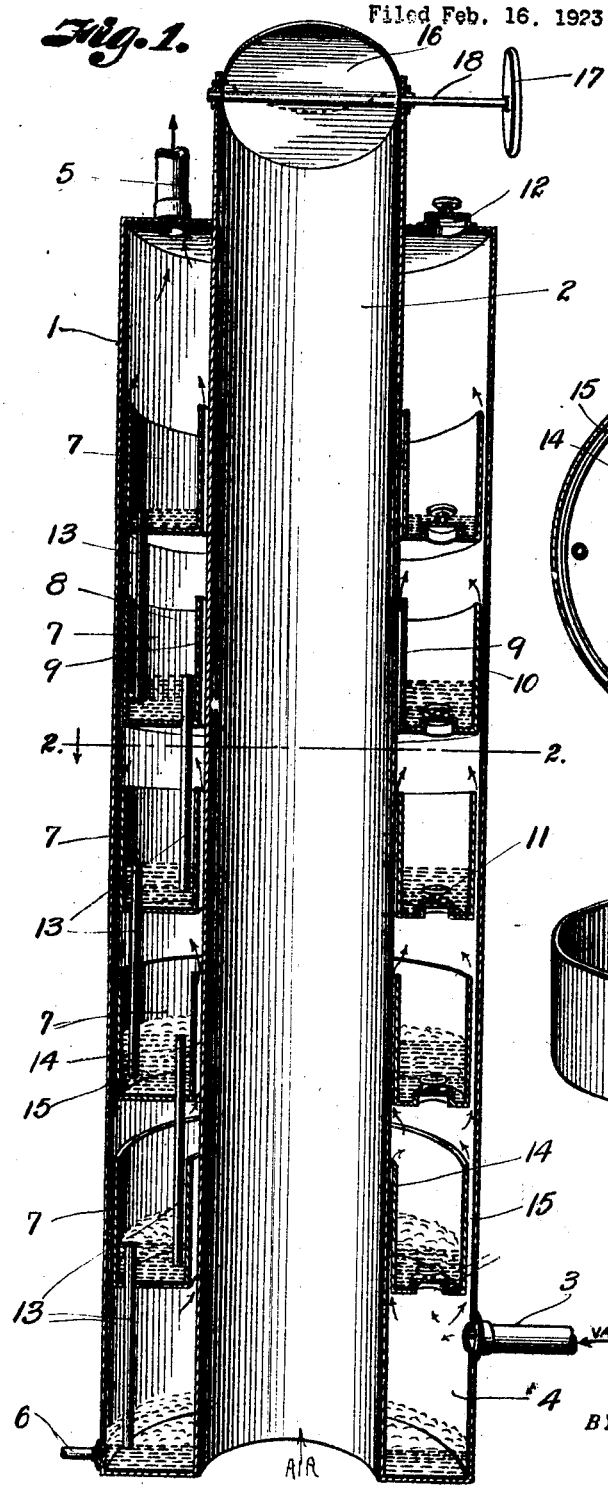
Fig. 1 is a vertical, longitudinal, sectional view through a dephlegmator constructed in accordance with my invention.
Figure 2:
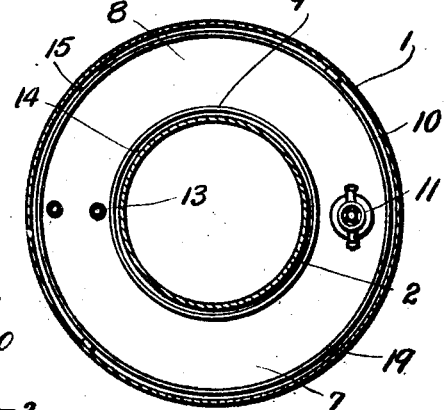
Fig. 2 is a cross sectional view on the line 2—2 of Fig. 1.
Figure 3:
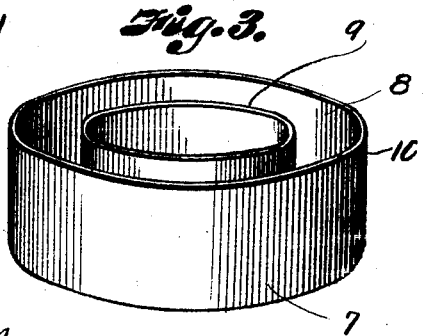
Fig. 3 is a detail, perspective view of one of the collector receptacles.

The invention is herein shown as consisting of a vertical, elongated hollow tower 1, closed at the top and bottom and having a central longitudinal air conduit or stack 2, co-extensive with the tower and preferably extending slightly above it. There is a vapor inlet pipe 3 connected to the tower near the bottom thereof to discharge into the space 4 between the tower and the stack. There is an outlet pipe 5 connected to the top of the tower by means of which the non-condensed vapors can be carried off to a condenser or to some other suitable device. There is a drain pipe 6, connected to the bottom of the tower below the inlet pipe 3.

Suitably disposed within the tower is a plurality of collector receptacles or pans 7, each of which consists of a double-walled annulus or ring-shaped pan having collecting spaces or chambers 8 between the inner wall 9 and the outer wall 10. In the bottom of each pan is shown a manhole 11 of approved construction and a similar manhole 12 is located at the top of the tower so that access can be had to all parts of the dephlegmator for the purpose of inspection and repairs.

Depending from the bottom of each pan is a pipe 13, the upper end of which extends slightly above the bottom of the pan which carries it, the top end of the pan extending above the lower end of the pipe depending from the next succeeding pan so that the top end of each pipe is in a higher plane than the lower end of the pipe from the pan above it, permitting the liquid to drain from one pan into another to maintain an appreciable amount of liquid in each pan. The space surrounded by the inner wall of each pan is greater in diameter than the diameter of the stack so that flow spaces 14 are provided between the stack and the inner wall of each pan, and the outer wall of each pan is of less diameter than the diameter of the tower so that there are outer flow spaces 15 between the outer wall of each pan and the tower.

At the top of the stack is a valve or damper 16 adapted to be operated by the hand wheel 17 on the shaft 18 which carries the damper.

When the vapors pass from the stills or digesters through the pipe 3 and are discharged into the bottom chamber of the tower, they first pass upwardly between the inner wall of the lowermost pan and the stack, and between the outer wall of the lowermost pan and the tower.

Since air surrounds the tower and air passes through the stack, it is obvious that the walls of the dephlegmator will be cooled and that there will be a heat exchange between the air and the vapors, the very heavy ends will begin to condense, and the condensate will flow into the bottom of the tower. As the vapors pass between the walls of the next succeeding pan and the stack and tower, additional vapors will be condensed and the resulting liquid will have a specific gravity higher than that of gasoline. As the heavier vapors are condensed in the successive chambers or pans, the condensate will accumulate in the pans until the levels rise high enough to overflow the inlet ends of the pipes 13. The overflow will pass to the next succeeding lower pan or chamber and so on down to the bottom chamber 4, where the liquid may be drawn off through the pipe 6.

If there are varying atmospheric conditions surrounding the dephlegmator, it is obvious that the product passing through pipe 5 would vary unless some means were provided for regulating the amount of air passing through the stack. This can be taken care of by varying the effective port area of the stack through the medium of the damper 16. The damper 16 will also be effective in varying the product under constant atmospheric conditions.

The pans or chambers 7 can be secured within the tower in any appropriate manner, for example, by brackets 19 of appropriate construction.

What I claim and desire to secure by Letters-Patent is:

1. A dephlegmator comprising a tower adapted to be air cooled, a stack adapted to be air cooled passing through the tower, ring-shaped collectors within the tower concentric with the air stack, the walls of the collector chambers being spaced from the stack and from the tower, an inlet for the tower and an outlet pipe leading therefrom.

2. A dephlegmator comprising a tower adapted to be air cooled, a stack adapted to be air cooled passing concentrically through the tower, the tower having an inlet and an outlet, ring-shaped collector chambers within the tower concentric with the stack, the ring-shaped collector chambers being arranged one above the other, the walls of the collector chamber being spaced from the tower and the stack to form passageways for vapor entering the tower and overflow pipes in the collector chambers, the overflow pipe of each chamber adapted to discharge into the chamber below.

3. A dephlegmator comprising a tower adapted to be air cooled, a stack adapted to be air cooled, passing concentrically through the tower, the tower having an inlet and an outlet, ring-shaped collector chambers within the tower concentric with the stack, the collector chambers being arranged one above the other, the walls of the collector chambers being spaced from the tower and stack to form passageways for vapor entering the tower and overflow pipes in the collector chambers, the overflow pipe of one chamber being adapted to discharge into the chamber below it, the inlet end of each pipe being in a higher plane than the discharge end of the pipe carried by the chamber above it.

4. A dephlegmator comprising a tower adapted to be air cooled, having an inlet and an outlet, a stack adapted to be air cooled running concentric through the tower, and ring-shaped collector chambers, U-shaped in cross section, concentric with the stack arranged one above the other, the inner walls of each collector chamber being spaced from the stack, the outer wall of each collector chamber being spaced from the tower.

In testimony whereof I affix my signature.

JOHN W. HANCOCK.